United States Patent [19]

Cologna et al.

[11] Patent Number: 4,820,564
[45] Date of Patent: Apr. 11, 1989

[54] BLIND-SIDE REPAIR PATCH KIT

[75] Inventors: Rudy L. Cologna, Bellevue; Melvin D. Eng, Seattle, both of Wash.

[73] Assignee: The Boeing Company, Seattle, Wash.

[21] Appl. No.: 665,809

[22] Filed: Oct. 29, 1984

[51] Int. Cl.[4] .................... B32B 3/10; E04G 23/02
[52] U.S. Cl. .................................. 428/63; 52/514; 156/98; 206/582; 428/116
[58] Field of Search ................. 428/63, 116; 206/582, 206/223; 156/94, 98; 52/514

[56] References Cited

U.S. PATENT DOCUMENTS

| | | | |
|---|---|---|---|
| 1,326,959 | 1/1920 | Paine et al. | 248/343 |
| 1,353,813 | 9/1920 | Hughes | 123/41.74 X |
| 2,512,469 | 6/1950 | Poss | 156/94 X |
| 2,598,194 | 5/1952 | Shippey | 52/514 |
| 2,638,774 | 5/1953 | Wieman | 52/514 |
| 2,795,523 | 6/1957 | Cobb et al. | 156/94 |
| 2,953,847 | 9/1960 | Reed | 156/94 X |
| 2,997,416 | 8/1961 | Helton | 156/98 |
| 3,094,964 | 6/1963 | Witten et al. | 156/94 X |
| 3,295,285 | 1/1967 | Metz | 52/514 |
| 3,325,955 | 6/1967 | Haut | 52/514 |
| 3,373,467 | 3/1968 | Loughrey | 52/514 X |
| 3,834,107 | 9/1974 | Standing | 52/514 |
| 3,987,580 | 10/1976 | Ausnit | 428/99 X |
| 4,075,809 | 2/1978 | Sirkin | 52/514 |
| 4,100,712 | 7/1978 | Hyman | 52/514 |
| 4,285,183 | 8/1981 | Condit | 52/514 |
| 4,297,823 | 11/1981 | Keisler | 52/514 |
| 4,354,332 | 10/1982 | Lentz | 52/514 |
| 4,370,842 | 2/1983 | Martin et al. | 52/514 |
| 4,405,048 | 9/1983 | Peake | 206/582 |
| 4,406,107 | 9/1983 | Schoonbeck et al. | 52/514 |
| 4,517,038 | 5/1985 | Miller | 156/94 X |
| 4,588,626 | 5/1986 | Cologna et al. | 428/63 |

OTHER PUBLICATIONS

Repair Guide for Large Area Composite Structure Repair Dated Mar. 1979, by J. D. Labor and S. H. Myhre.
"Boeing 767 Structural Repair Manual", dated Jun. 10, 1984, pp. 22-24 and 43-45.

Primary Examiner—Henry F. Epstein
Attorney, Agent, or Firm—J. Michael Neary

[57] ABSTRACT

A repair patch kit for repairing holes in panels of composite materials includes a bolt having a rigid washer of about the same diameter as the hole to be repaired. The rigid washer bears against a flexible washer that is substantially larger than the hole. The flexible washer has radiating flukes extending from a central hub region. The flukes can bend when the flexible washer is pushed through the hole and then spring back to their original shape on the blind-side. One edge of the flukes is curved which causes the flukes to twist and present only one edge to the edge of the hole as the flexible washer is pushed through, to facilitate passage of the flexible washer through the hole. A set of resin-impregnated fabric plies is pushed through the hole behind the flexible washer on the bolt and is pressed against the marginal regions of the hole on the blind side of the panel by the flexible washer. The hole is packed full of resin-impregnated fill material or a plug cut from a similar panel, and a set of resin-impregnated repair plies is pressed over the fill material and against the near side of the panel around the marginal regions of the hole by a back-up plate on the bolt. The entire assembly is squeezed tight against the panel by a nut on the bolt and held in place while the resin cures, after which the nut and plate are removed and the bolt is cut off flush with the near side panel surface.

29 Claims, 4 Drawing Sheets

BLIND-SIDE REPAIR PATCH KIT

BACKGROUND OF THE INVENTION

This invention is related to the invention disclosed in U.S. patent application Ser. No. 665,810 filed concurrently herewith, now U.S. Pat. No. 4,588,626.

This invention relates to repair patches for both sides of a panel, one side of which is inaccessible, and more particularly to repair patches for such panels made of composite material.

There are a great many structures made with panels which are accessible only from one side. These include vehicles of all varieties, such as ground and water vehicles, aircraft and even space vehicles, and also include fixed structures such as buildings and storage tanks. When damage occurs to these panels, the damage must be repaired to restore the structural strength of the panel, restore its smoothness and appearance, and in the case of aerodynamic surfaces, reconfigure the surface to its original curvature or configuration, as close as possible to the original mold line. Repairing the accessible or near-side of the panel is seldom difficult but the panel cannot be restored to full strength if the inaccessible or blind-side of the panel is not repaired. Such blind-side repairs are difficult because of the limited access for positioning the patch material and applying pressure while it cures in place. A panel patched only on its near-side is weak on the blind-side because it is unable to transfer loads across the damaged section. When such a panel is subjected to a bending moment, it is subject to failure at loads much lower than the design capacity of the panel.

The problem is particularly troublesome with modern composite materials because of the higher load requirements for these materials and because of the necessity for producing flush repairs without the use of fasteners. Fasteners were permitted in prior art near-side patches but are undesirable for modern composite material patches. To accommodate the fasteners, additional holes must be drilled in the material, which creates additional weakness in the panel. Moreover, it is difficult to produce a path that is flush with the original mold line of the panel and conforms exactly with its curvature when using a patch secured with fasteners. Finally, such fasteners exert a constant compression force on the repaired composite panel or honeycomb panel to hold the patch in place which could distort the cross section of the panel in the patch location and thereby reduce its load carrying capacity.

The installation of prior art patches in the vicinity of underlying spars and ribs within the member on the blind-side of the panel requires specially designed patches or connecting structure to the struts or ribs which could interfere with underlying mechanisms. On panels which form an aerodynamic surface, especially on high performance aircraft, the non-conformance to the original contour and loss of smoothness could produce a flutter of the control surface which could adversly affect aircraft performance and cause premature fatigue delaminating of the panel structure.

The few prior art patches for composite materials which provide for patch material on the blind-side require a series of steps, each requiring a separate cure time for the bonding agent in each of the steps. This prolongs the repair process and increases the number of steps involved in making the repair, thereby increasing the cost and increasing the down time of the equipment being repaired. In addition, it is an exacting process requiring special skills and care to produce an acceptable patch. Moreover, the prior art blind-side patches require complicated expensive and cumbersome equipment requiring special training of operators and subject to failure in operation which would interupt the capability of the facility to make those repairs.

Some other unsolved problems with prior art patches have been the inability to effect a permanent hermetic seal against leakage of pressurized fuel, air, water and other fluids and gases through the patch. Also, prior art patches are often thermally or chemically incompatible with the parent structure so that differential rates of thermal expansion cause loss of hermetic integrity of the patch or cause the panel to become distorted. Chemical incompatibility could cause loss of chemical resistance to certain chemicals such as hydraulic fluid which could cause the patch to swell and weaken. In addition, dissimilar metals and carbon/metal combinations can cause a harmful galvanic reaction that would weaken the patch.

SUMMARY OF THE INVENTION

Accordingly, it is an object of this invention to provide a blind-side patch which provides secure load carrying materials on both the blind-side and the near-side of the panel to restore the panel to nearly its full original load carrying capability. It is another object of this invention to provide a patch which may be made nearly flush with the original near-side surface and conforms to the original curvature of the panel. It is yet a further object of the invention to provide structure and a method for applying pressure to the patch on the blind-side of the panel while the resin cures during patch formation without contacting or interferring with structure within or behind the panel, and which can cure at the same time that the resin in the near-side patch is curing. It is yet another object of the invention to provide a blind-side patch that is fast and simple to apply, is itself inexpensive and does not require expensive, cumbersome or complicated equipment, and which requires no special skills for its installation. It is an additional object of the invention to provide a blind-side patch specifically for composite material that hermatically seals the patch permanently and is compatible thermally and chemically with the original panel material.

These and other objects of the invention are attained in a blind-side patch, and method for making a blind-side repair of a panel, including a tension exerting member such as a bolt, with a head or a washer just slightly smaller than the hole in the panel, and a flexible washer over a stack of fabric plies impregnated with a bonding agent. The flexible washer flexes when pushed through the hole and then expands out to about its original diameter to cover the marginal regions around the blind-side of the hole. Pressure is transmitted from the bolt through the washer to the flexible washer to press the stack of impregnated plies against the blind-side of the panel in a broad marginal region around the hole. The hole in the panel is filled with a fill material, such as potting material or a plug from the original or similar panel, and the near-side of the panel is repaired with fabric plies impregnated with a bonding agent and compressed against the near-side of the panel by a backup plate and a nut on the proximal end of the bolt. After the bonding agent on the blind-side and near-side plies has cured, the nut and support plate are removed and the bolt is cut-off flush with the repaired surface of the panel.

Brief Description of the Drawings

The invention and its many attendant objects and advantages will become better understood by reference to the following detailed description of the preferred embodiment when read in conjunction with the following drawings, wherein.

DESCRIPTION OF THE PREFERRED EMBODIMENT

Figure 1:
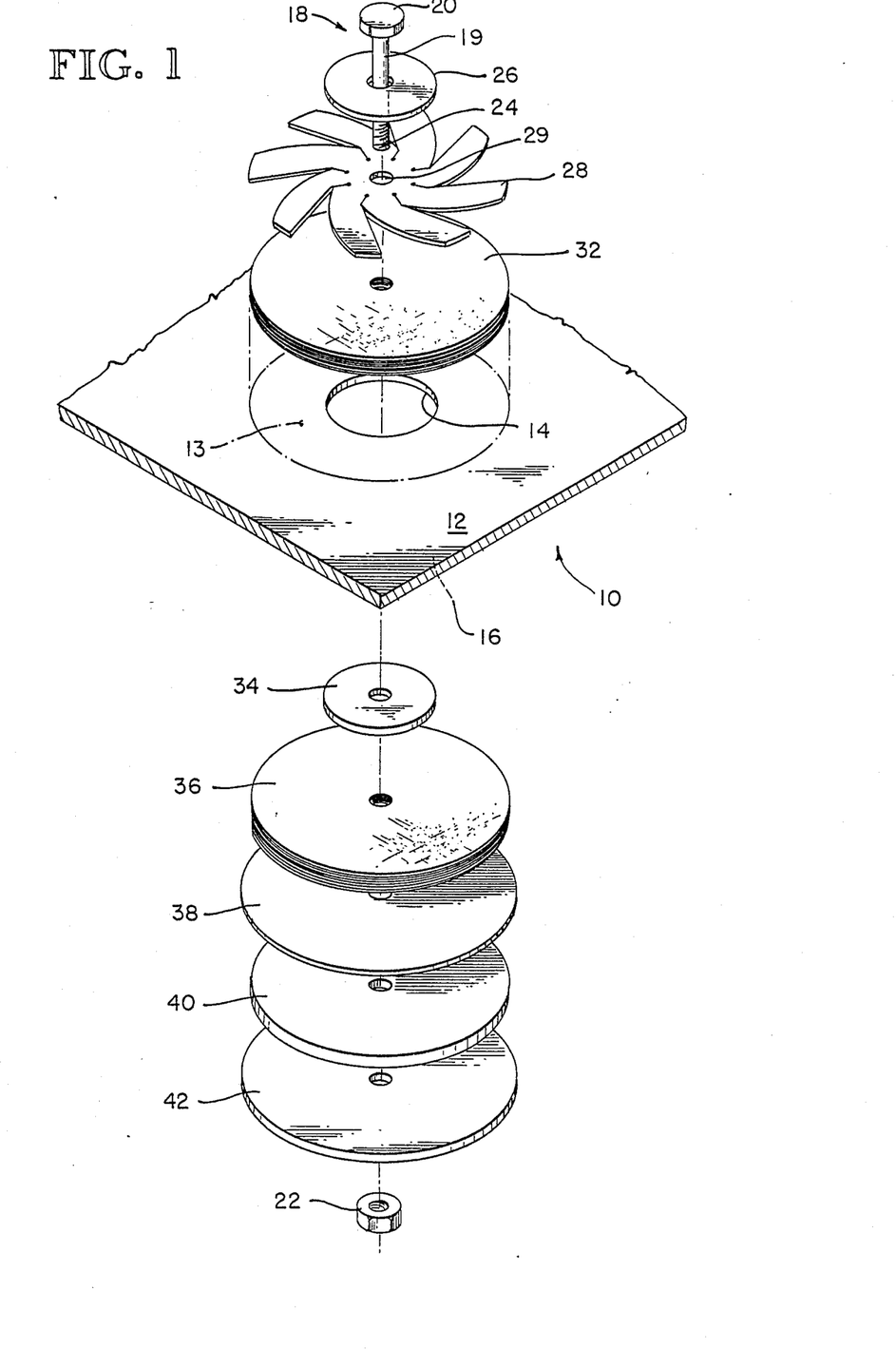
FIG. 1 is an exploded isometric view of a two sided panel patch made in accordance with this invention.

Turning now to the drawings, wherein like or primed reference numerals designate identical or corresponding parts, and more particularly to FIG. 1 thereof, a blind-side patch for a composite material panel 10 having a blind-side 12 to which access is restricted, or is limited to the marginal regions 13 around a circular opening or hole 14 in the panel. The panel also has a near-side 16 which is accessible to the repair personnel. The patch can be applied and used in any orientation, but the description herein will assume that the blind-side is "up" and the relational prepositions such as "above" and "under" will be used with reference to this orientation for description simplicity, but without restrictive effect.

The disclosed patch can be used on virtually any material to which a bonding agent, such as resins or other exotic adhesives, will adhere or can be made to adhere. It is particularly useful for repairing holes in panels of conventional composite material made of layers of oriented fibers or fabric such as fiberglass impregnated with resin and cured to the desired shape, and was specifically designed and extremely effective for repairing holes in panels of modern composite materials including boron, Kevlar and graphite fabric impregnated with any one of a multitude of high strength and/or high temperature resins or bonding agents which can be cured by catalyzed or other reaction curing to form a strong rigid and lightweight structural panel.

The hole 14 in the panel 10 shown in FIG. 1 is formed by a hole cutting saw which removes the damaged section from the panel 10 and creates a circular hole of precise predetermined diameter, for example, 2.0 inches. The inside marginal regions 13 around the blind-side of the hole 14 are cleaned with sandpaper or chemical cleaner or primer. Because of the nature of composite material, any cracks in the material which were formed when the damage was done will not propagate through the material so that the hole cutting saw can remove the entire damaged section. The patch shown can be used to repair other materials such as aluminum, but it is desirable to cut out all of the damaged area including cracks which may have propagated from the damaged area before the patch is applied.

A bolt 18 having an elongated shank 19 and a head 20 is disposed coaxially in the hole 14 and serves to exert a compressive force on the elements of the patch while the patch resin cures. The bolt 18 is presumably made of non-metalic material such as nylon or Kevlar, although stainless steel is also a suitable material where high pressure is desired. Non-metalic material is desirable because it is easy to shear off flush after the patch bonding agent has cured. A nut 22 threaded onto the proximal end 24 of the bolt shank 19 is tightened to exert tensile force on the bolt and thereby create the compressive pressure on the patch elements.

A centrally apertured solid washer 26 is disposed on the bolt 18 in contact with the head 20 on the distal end of the bolt 18. The solid washer 26 is circular in form and is approximately the same diameter as the hole 14, but just slightly smaller in diameter than the hole 14 so that the washer can fit through the hole from the near-side 16 of the panel 12. The bolt shank may be integral with the washer 26 and thereby function as both washer 26 and bolt head 20, to obviate the need for a separate bolt head 20.

Figure 2:
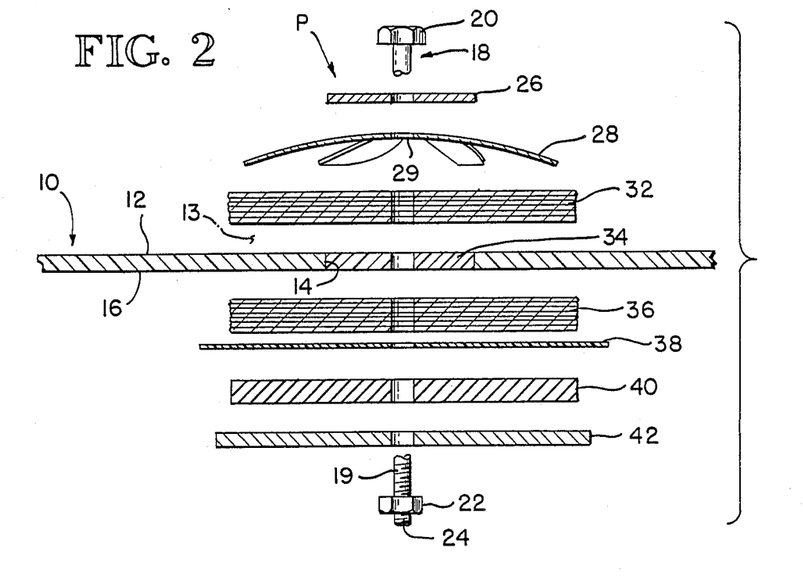
FIG. 2 is an exploded sectional elevation of the patch shown in FIG. 1.
Figures 5, 6, 7:
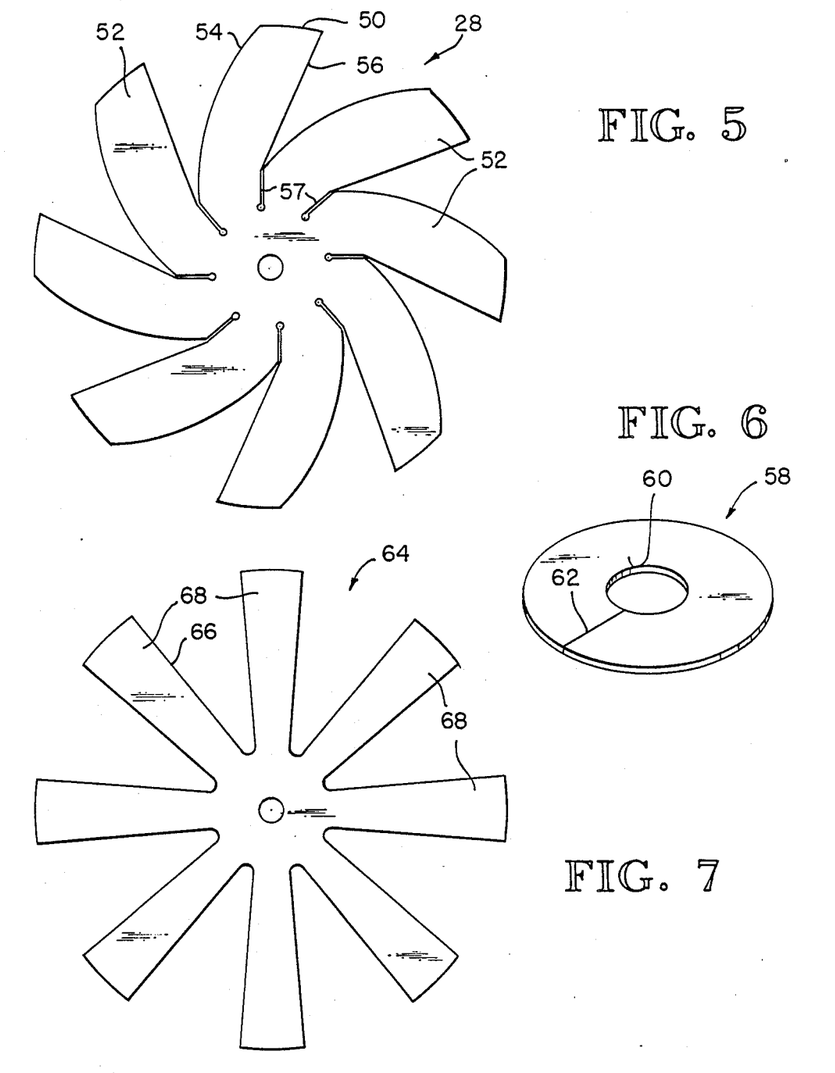
FIG. 5 is plan view of a spiral fluke flexible washer used in the patch assembly of FIG. 1.
FIG. 6 is a isometric view of a flexible disc washer cut along one radius which can be used in the patchs of FIGS. 1, 3, 9 and 10.
FIG. 7 is a plan view of a radial fluke flexible washer which can be used in the patch of FIGS. 1 and 3.

A flexible washer 28 having a central aperture 29 is disposed on the bolt 18 under the solid washer 26. The diameter of the flexible washer, as shown in FIG. 1 and even more clearly in FIG. 2, is substantially greater than the diameter of the hole 14 so that the washer covers the hole and overlaps the marginal regions 13 around the edge of the hole 14. The flexible washer 28 is made flexible so that it can be pushed through the hole 14 and it will flex as it is pushed through the hole, whereupon it will spring back to its original shape or to a fairly close approximation thereto. Any form or combination of flexible washers may be used in this application, provided that it/they are sufficiently stiff to exert the necessary pressure on the underlying repair material as described below. Some forms of flexible washers which have been specifically designed for this application are shown in FIGS. 5, 6 and 7 but other forms of washers will occur to those skilled in the art. The invention is not limited to the particular forms of washer disclosed herein, except as claimed.

A stack of sheet material laminae, such as filamentous or fabric plies 32 is disposed on the bolt 18 underlying the flexible washer 28. Typically, on double-sided patches shown in FIG. 1 and 2, the stack on each side will contain one more than one half the number of plies in the panel. The fabric plies 32 are coated (e.g. impregnated) with a bonding agent such as liquid resin which is selected for its strength, compatibility with and adhesion to the material of the panel 10 and the fabric plies 32. The liquid resin may be the same as was used in the original construction of the panel. It will typically be a room temperature cureable or heat cureable resin.

Figure 3:
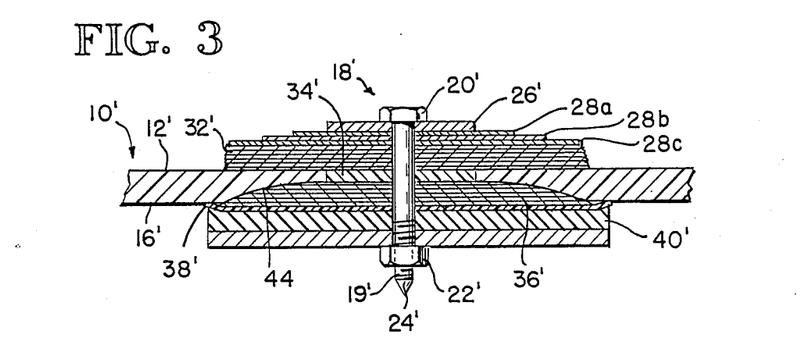
FIG. 3 is a sectional elevation of a modification of the patch shown in FIG. 2.

For maximum strength and load transfer capability across the hole 14, it is preferrable that the fabric plies 32 not be punched with a hole to fit onto the bolt, but rather that the threads merely be pushed aside to allow the bolt to fit through the plies. One simple way of accomplishing this is to use a pointed, tapered instrument which can be pushed into the fabric and will push the fabric threads apart to allow passage onto the bolt 18 without cutting the threads. Another way, illustrated in FIG. 3, is to use a bolt with a proximal end tapering to a point. The point is inserted into the fabric and moved around to push the threads aside, without breaking them, to create a hole wide enough for the passage of the bolt without the threads catching on the bolt threads. The complete uncut threads then provide the optimal load path across the hole through the patch without creating abrupt thread ends within the patch material itself which could tend to act as stress risers.

A plug 34 of fill material is disposed in the hole 14, filling the hole completely. The plug 34 can be a wad of resin soaked fibers which can cure within the hole at the same time that the rest of the patch resin is curing, or it can be a circular plug cut from the same material from which the panel is made, using the same size hole cutter that is used to cut the hole 14. This will insure that the diameter of the plug 34 is the same as the hole 14 (discounting the thickness of the hole cutting saw), and ensures that the thickness of the plug 34 is the same as the thickness of the panel 10. It is typically unnecessary to soak a plug 34 that is cut from a panel which is similar to the panel 10 in resin because there is sufficient excess resin in the fabric plies 32 and 36 that is squeezed into the hole during patch formation so that no additional resin is necessary.

The path assembly at this point in the repair process has the bolt 18 protruding from a single aperture in the plug 34, and the head 20 of the bolt 18 bearing against the solid washer 26, which in turn bears against the flexible washer 28, which in turns bears against the resin impregnated fabric plies 32 on the blind-side 12 of the panel 10. The solid washer 26, being about the same diameter as the hole 14, is unable to pull through the hole because of the stiffness and shear strength of the flexible washer 28. The flexible washer 28 exerts a substantially uniformed pressure over the entire surface of the fabric plies 32. As shown in FIG. 2, when a flexible washer 28 is pushed through the hole it will often be plastically deformed to a slightly concave configuration as shown which will militate for uniform exertion of pressure over the entire face of the fabric plies 32. However, it is desirable that excessive force not be exerted on the bolt 18 to preclude an upward dishing of the flexible washer 28 which could lessen the pressure exerted on the outer regions of the fabric plies 32 and thereby weaken the bond at that point.

A second set of resin impregnated fabric plies 36, identical to the first set 32, is slid onto the proximal end of the bold 18 protruding through the hole in the plug 34. A release agent or film 38 and a disc 40 of compliant material such as rubber is slid onto the bolt. The releae film 38 is selected to prevent adhesion of the disc 40 to the patch material for easy removal of the disc 40 after the resin has cured. The disc 40 is covered with a solid steel support plate 42, and the nut 22 is screwed onto the end of the bolt 18 and tightened to exert the required compressive force on the washer 26 and plate 42 and hence on the plies 32 and 36. The compressive pressure on the plies 32 and 36 uniformly distributes the resin throughout the fabric and squeezes excessive resin out of the material. More importantly, the pressure expresses the voids from the fabric plies. Such voids could tend to form stress risers and points of weakness within the patch. As mentioned earlier, the compressive force also squeezes the excess resin into the hole 14, filing the crack between the plug 34 and the sides of the hole 14 and providing a continuous body of material throughout the patch. The rubber disc 40 is squeezed by the support plate 42 against the fabric plies 36 (through the release film 38) and tends to smooth the patch material and form a smoothly tapered surface profile on the near-side 16 of the panel 10.

After the resin in the patch material has cured, the nut 22 is unscrewed from the proximal end 24 of the bolt 18, and the support plate 42, the rubber disc 40, and the release film 38 are slid off the bolt. The bolt is then cut off flush with the surface of the patch and, if desired, the patch may be buffed and finish coated to match the coating on the near-side 16 of the panel 10. The fabric plies 32 and 36 in the completed patch provide a strong load path across the hole 14 in both compressive and tensile stresses so that the bending moments exerted on the panel in either direction are borne with virtually the same load carrying capacity as the original panel.

To improve the adhesion of the patch material to the panel surfaces, it is sometimes desirable to provide yieldable plies immediately adjacent the surfaces of the panel. This allows the inner layers of the plies 32 and 36 to yield under high stress and transfer the load to the overlying plies rather than delaminate from the panel surfaces. This can be achieved by using lesser strength materials on the inside surfaces of the patch. One example is to use one or two plies of glass fabric adjacent the surfaces 12 and 16 of the panel 10 and two to five plies (depending on the panel thickness) of graphite fabric over the glass fabric plies. This enables the glass fabric plies to yield and transfer the stress to the graphite fabric rather than peel away from the surface of the panel 10. The load carrying capacity in the patch is thereby increased.

When it is desired to retain exactly the original mold line configuration of the panel, the near-side of the panel in the marginal regions around the hole 14 may be scarfed to provide a tappered recess into which the near-side plies can lie within the original mold lines of the panel. A patch of this configuration is shown in FIG. 3 showing a scarf 44 cut into the near-side surface 16' of the panel 10'. The use of a scarf 44 in the surface of the panel 10' makes it desirable to use a stack of repair plies 36' which are of slightly increasing diameter moving toward the proximal end 24' of the bolt 18'. The, scarf can be cut with a simple convex grinder or sanding disc with an edge depth gauge.

The patch shown in FIG. 3 also includes a plurality of flexible washers 28a, 28b and 28c. This allows a more uniform transfer of pressure from the bolt head 20' through the solid washer 26', through the flexible washers 28 a–c to the radially outer regions of the fabric plies 32' without recourse to a flexible washer of excessive stiffness.

Figure 4:
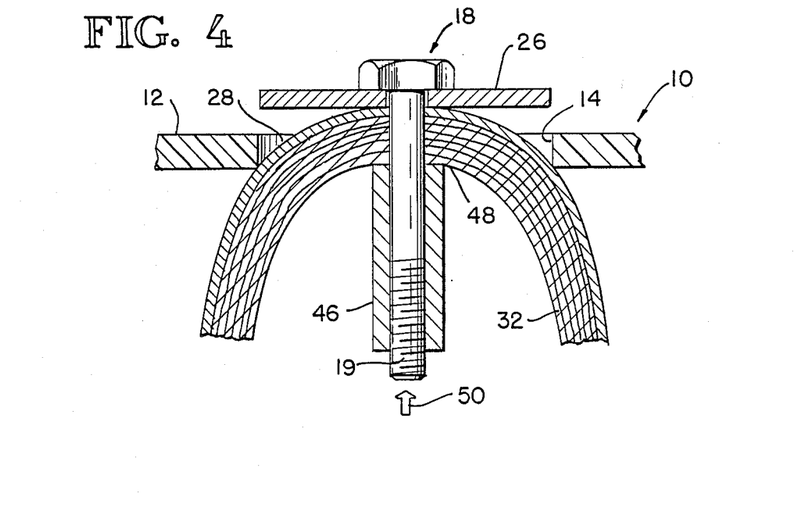
FIG. 4 is a sectional elevation of the blind-side portions of the patch shown in FIG. 1 being installed.

The method of installation of the patch shown in FIGURES 1 and 2 through the hole 14 in the panel 10 is shown in FIG. 4. The blind-side elements of the patch, namely the solid washer 26, the flexible washer 28 and the resin impregnated blind-side fabric plies 32 are inserted onto the bolt 18, and a tool 46 is then inserted onto the bolt 18 with its distal end 48 abutting against the inner regions of the plies 32 around the bolt 18. The tool 46 is nothing more than a piece of pipe having an interior bore which closely fits around the bolt shank 19. Its purpose is to exert a pushing force on the inner regions of the fabric plies 32 and the flexible washer 28 to force the washer to bend, as shown in FIGURE 4, and pass through the hole 14, and hold the bolt from being shot into the cavity behind the blind-side 12 of the panel 10 when the flexible washer 28 springs back from its flexed shape shown. After the blind-side elements of the patch are pushed through the hole 14, the tool 46 is removed for installation of the other patch elements.

Several flexible washers are shown in FIGS. 5, 6 and 7. The washer 28 shown in FIG. 5 has a circular outer periphery 50 and includes a plurality of eight flukes 52, each having a curved edge 54 and a straight edge 56. At the junction of the straight edge 56 and the curved edge 54 of the adjacent fluke 52, the flexible disc 28 is cut on a radial line 57 a distance sufficient to give the fluke 52 the required flexibility to pass through the hole 14 without excessive plastic deformation. The spiral shape of the fluke 52 produces an off-set force on the fluke as it is pushed into the hole 14 which gives it a slight twist as it bends, so that it presents its curved edge to the edge of the hole 14 to minimize the frictional resistance of the flexible washer as it passes through the hole.

Figure 10:
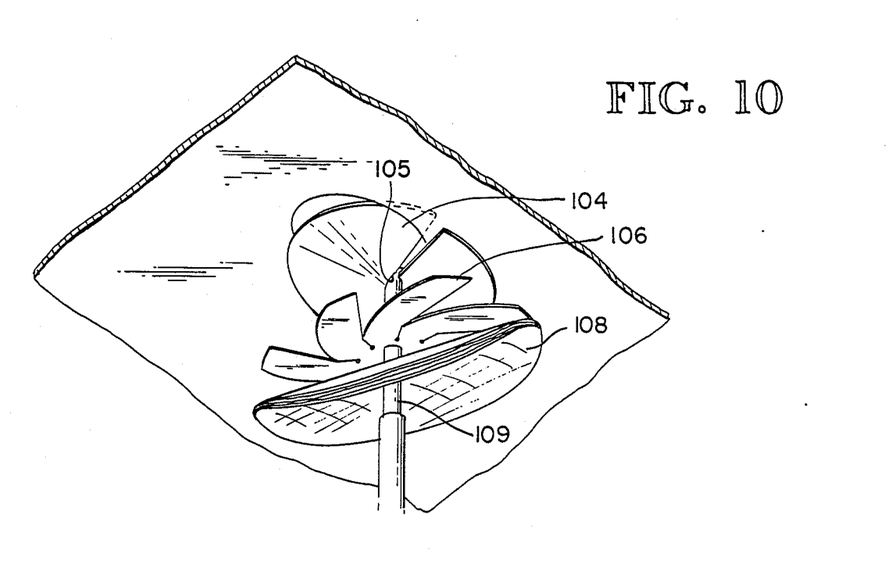
FIG. 10 is an isometric view of the flexible disc of FIG. 6 being threaded into a hole in the panel of FIG. 9.

Another form of flexible washer is the flexible disc 58, shown in FIG. 6, in the form of a flat or slightly domed washer having a central hole 60, and a cut or slit 62 running from the hole 60 out to the circumferential edge of the flexible washer 58 along one radius. The slit 62 enables the flexible washer 58 to be twisted slightly so that one edge can be threaded into the hole 14 as illustrated in FIG. 10, and then the entire washer 58 can be rotated into the hole even though the washer is of a greater diameter than the hole 14. Disc 58 distributes the compressive force exerted by the bolt head 20 over the radially outer portions of the fabric plies 32 as uniformly as possible when the nut 22 is tightened. The disc 58 may be made perfectly flat if it has sufficient stiffness to resist dishing up at its outer edges when tightened to exert the required pressure against the blind-side plies.

Yet a third form of flexible washer is shown in FIGURE 7. This washer uses a flat disc 64 having rounded wedge shaped cutouts 66 evenly spaced around the disc to form between them a series of eight radially extending flukes 68 which are wider at their radially extremities than they are at their inner regions. To increase the stiffness at the inner regions of the flukes 68, so that the pressure is sufficient and uniform over the entire patch, the disc 64 can be made thicker at its center, tapering to thinner at its radial outer edges.

The flexible washers shown in FIGS. 5, 6 and 7 may be used together in the manner shown in FIG. 3. For example the washer of FIG. 6 can serve as the top washer 28a, the washer shown in FIG. 7 can be the second washer 28b or bottom washer 28c, and the washer shown in FIG. 7 can be the bottom washer 28c, or the second washer 28b. Other combinations and other washer configurations will occur to those skilled in the art in view of this disclosure.

Figure 8:
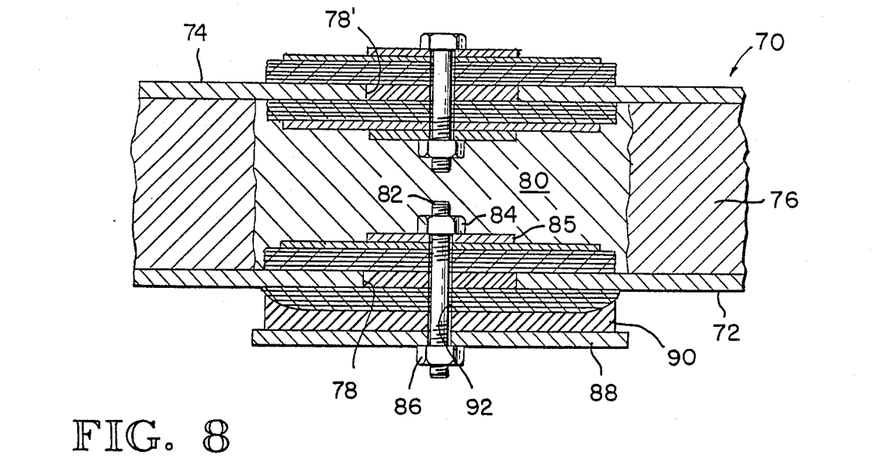
FIG. 8 is a sectional elevation of the patch of this invention being used to repair a thick honeycomb core panel.

Some composite material panels utilize an inner and outer skin of composite material and a honeycomb core between them. The repair of this type of panel has been particularly difficult in the prior art, but the use of this invention makes a quick and extremely strong repair of these panels. The process and structure of such a repair is illustrated in FIG. 8 in which the honeycomb panel 70 includes a near-side skin 72 and a blind-side skin 74, sandwiching between them a thick core 76 of honeycomb or syntactic foam. To accomplish the repair, a hole 78 is drilled in the near-side skin 72 with a hole saw similar to that used to drill the hole 14 in the panel 10, and the hole is continued straight through the panel to form a hole 78' of the same diameter in the blind-side skin 74. The honeycomb material in the region of the damage is removed to provide a cavity 80 to accommodate the repair materials. The blind-side skin 74 is then repaired in the same manner as that shown for the repair of the panel 10 in FIGS. 1 and 2, although the compliant disc 40 is not necessary since the lower surface of the patch on the blind-side skin 74 is in the interior of the panel 70.

Without waiting for the resin in the blind-side panel patch to cure, the near-side skin 72 is also repaired in the same manner as that disclosed for the panel 10 in FIGS. 1 and 2, with the difference that, instead of using a bolt 18 with a head 20, a threaded rod 82 with a nut 84 on its distal end is used. The nut 84 could be fastened to the solid washer, or integral with it, so that it would not turn when the nut 86 is tightened against the support plate 88. A release material is coated on the threaded rod 82 so that the bonding agent in the patch material will not stick to the rod 82.

After the bonding agent in the patch material for the near-side skin repair patch has cured, the nut 86, support plate 88 and rubber disc 90 are removed. The threaded rod 82 is unscrewed from the nut 84, leaving a axial hole 92 through the center of the patch in the near-side skin 72. The hole 92 provides a convenient access for injecting a syntactic foam into the cavity 80 which cures in place to rigidify the panel in the region of the patch, in the same manner as the original honeycomb provided.

Figure 9:
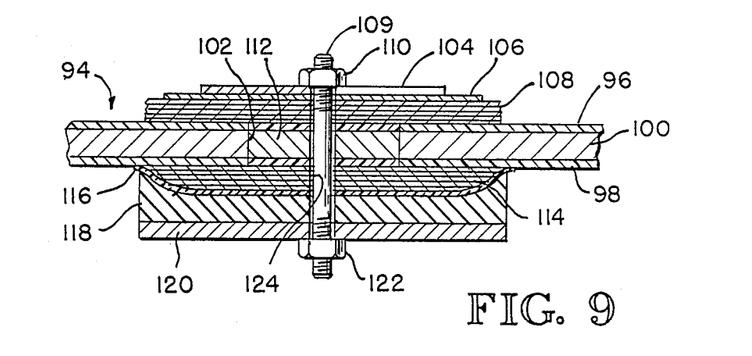
FIG. 9 is a sectional elevation of a thin honeycomb core panel being repaired with a patch of this invention.

Some honeycomb panels are too thin to accomodate patch elements in their core. Such a panel 94, illustrated in FIG. 9, includes a blind-side skin 96 and a parallel, spaced near-side skin 98, sandwiching a honeycomb or syntactic foam core 100. A hole 102 is drilled with a conventional hole saw through both skins and the core of the panel. A cut or slit, flat, circular turn-in disc 104 having a center bolt hole and a straight radial slot from circumference to bolt hole, a flexible washer 106, and a stack of blind-side resin impregnated fabric plies 108 are slid onto a threaded rod 109 having a nut 110 on its distal end and coated with a release material like that used on the rod 82 in FIG. 8. The assembly is inserted through the hole 102 in the same manner as that illustrated in FIG. 4. The slit turn-in disc 104 and flexible washer 106 may also be used in the patch of FIGS. 1 and 2. Alternatively, a stack of slit, discs 104 may be used, with their slits misaligned angularly and with a bonding agent applied between them when inserted through the hole 102 to the blind-side of the panel. The number of discs 104 may be adjusted to attain whatever stiffness is desired. The number of fabric plies 108 in the stack may be as few as one, but preferrably is equal to one more than is in the blind side skin. A thin panel will typically have two or three ply skins, so each stack of repair plies for repair of such a panel will have three or four plies.

The diameter of the disc 104 can be as large as twice the diameter of the hole 102 in the panel, less the diameter of the threaded rod 109. However, for each of insertion the disc 104 is made slightly smaller. Specifically, it has been found that the disc is very easily inserted if its diameter is made equal to twice the diameter of the hole 102 in the panel, less twice the diameter of the rod 109. It is desirable to raise the rod 109 sufficiently that the bolt head or nut 110 is clear of the panel, that is, it overlies the blind-side of the panel, so the disc can be revolved into the hole 102 using the rod 109 as a handle.

A core plug 112, preferably cut from a similar panel with the same size hole cutting saw that cut the hole 102, is fitted over the rod 109 and into the hole 102. A stack of repair plies 114 is slid onto the bolt and is covered by a release film 116. A compliant disc 118 covered by a rigid support plate 120 slides onto the bolt is secured by a nut 122. The nut 122 is torqued up tight against the support plate to produce sufficient pressure on the repair plies 108 and 114 to squeeze the excess resin out of the plies and into the core plug 102, and to express all voids out of the plies 108 and 114.

After the resin has cured, the removable rod 109 may be unscrewed from the threaded hole 124 created by the resin curing around the rod 124. The hole 124 provides an inspection port for insertion of the probe of a fiber optic inspection instrument. This allows inspection of the interior structure behind the panel without weakening the panel. The hole 109 can then be replugged and sealed with non-permanent sealent on the same threaded rod 109 by providing a screw driver slot in its proximal end and screwing it in flush with the outer surface of the patch. The patches of FIG. 1 and 3 may also be made using a removable rod by replacing the headed bolts 18 and 18' with similar threaded rods 109 and nuts 110.

The slit disc turn-in disc 104 may be used without the fabric plies to provide a hermetically sealed back-up plate on the blind-side of a panel for panel repairs that do not require restoration of substantial strength, or for panels that are not load bearing. The repair is accomplished by inserting the disc 104, on its rod 109 and nut 110 with or without a back-up washer 26, through the panel hole 102, and applying a bonding agent such as resin to adhere the disc 104 to the marginal regions around the hole 102 on the panel blind-side, and also to seal the radial slit in the disc. The rod 109 is held in place with a nut 122 against a support plate 120 or suitable spider while the resin cures. Likewise, the flexible washers of FIGS. 5 and 7 with back-up washers 26 may be used in the same manner for the same purpose.

Obviously numerous modifications and variations of the patch structure and method disclosed above are possible and will occur to those skilled in the art in view of this disclosure. Therefore it is expressly to be understood that these modifications and variations, and the equivalents thereof, may be practiced while remaining within the spirit and scope of this invention as defined in the following claims, wherein I claim:

1. A blind-side repair patch kit for repairing a hole in a composite material panel having a blind-side to which access is restricted, and opposite to said blind-side, a near-side which is readily accessible, comprising:
   a threaded rod;
   a washer having an outside diameter approximately equal to the diameter of said hole;
   means for generating tensile force in said rod on the near-side of said panel;
   means for transmitting tensile force generated in said rod on the near-side of said panel to said washer on the blind-side of said panel;
   at least one unitary flexible washer formed from stiff and resilient sheet material, and having a central aperture through which said rod extends when said patch is assembled, said flexible washer being larger than said hole and adapted to be bonded to the marginal regions around said panel hole by a bonding agent while pressed in place against said panel blind-side by said washer.

2. The patch kit defined in claim 1, further comprising:
   a plurality of blind-side plies of fabric, adapted to be impregnated with a bonding agent, about equal in size with said flexible washer and adapted to cover said panel hole and adhere to the blind-side of said panel on the marginal regions around said panel hole, and to cover and adhere to a core plug of fill material filling said hole while covered by and pressed against said panel blind-side by said flexible washer;
   a plurality of near-side plies of fabric, adapted to be impregnated with a bonding agent and adhered to said near-side of said panel on the marginal regions around said hole and to said plug of fill material, said near-side plies being about the same size as said blind-side plies;
   said threaded rod extending through a centrally located opening in said near-side plies and said far side plies;
   a centrally bored support plate adapted to be placed over and covering said near-side plies with said rod extending through said bore;
   said tensile force generating means includes a nut for screwing onto the proximal end of said rod and bearing against said support plate to squeeze said washer and said flexible washer against said blind-side plies, and to squeeze said support plate against said near-side plies to compress said plies and express the voids therefrom.

3. The repair patch kit defined in claim 2, wherein said threaded rod is sharpened on the proximal end thereof to facilitate insertion through said fabric plies without breaking the fabric threads.

4. The repair patch kit defined in claim 2, further comprising at least one additional flexible washer between said one flexible washer and said blind-side plies.

5. The repair patch kit defined in claim 2, wherein said threaded rod is coated with a release material to which said bonding agent does not adhere so that said rod may be unscrewed out of the threaded hole created by the curing of said bonding agent around said rod, providing a reinforced inspection/attachment port for insertion of an inspection probe, and to serve as an anchor for attachment of other structure to said panel.

6. The repair patch kit defined in claim 2, further comprising a compliant sheet for positioning between said support plate and said near-side plies so that pressure exerted by said support plate on said compliant sheet will smooth and taper said near-side plies while they cure.

7. The repair patch kit defined in claim 6, further comprising a release film between said compliant sheet and said near-side repair plies, to facilitate removal of said compliant sheet after said bonding agent has cured.

8. The repair patch kit defined in claim 2, wherein said flexible washer includes a series of radiating flukes extending outwardly from an integral central hub, said flukes each being individually flexible and bending backward when said flexible washer is pushed axially through said panel hole and then springing out to approximately their original shape after passing through said panel hole.

9. A blind-side repair patch kit for repairing a first side of a damaged panel to which access is restricted and wherein the damaged portion of said panel is cut out with a hole saw leaving a circular hole in said panel, said repair being made from the other side of said panel, to which access is available, comprising:
- a tension member for transmitting a tensile force exerted from the other side of the panel to the first side;
- a tension maker attachable to said tension member for putting said tension member in tension;
- a substantially flat flexible disc having a diameter substantially larger than said hole and sufficiently flexible that it can be flexed and passed through the hole, and sufficiently stiff that it can exert sufficient pressure on the marginal regions around the hole on the first side of the panel to express air bubbles from an adhesive impregnated fabric patch and hold the patch in place under pressure against the first side of the panel on the marginal regions around the hole;
- a blind-side solid washer slightly smaller in diameter than the panel hole and adapted to be coupled to said tension member and passed through the hole for transmitting and distributing the tensile force exerted by said tension member through said flexible disc to the first side of the panel around the marginal regions of the hole;
- at least one fabric disc adapted to be impregnated with an adhesive and having a diameter about equal to the diameter of said flexible disc and adapted to be inserted coaxially onto said tension member and squeezed between said flexible disc and the first-side of said panel;
- a near side back-up plate adapted to be disposed on said tension member in force transmitting relationship with said tension maker for transmitting and distributing force from said tension maker to said panel near side over the marginal regions thereof around said hole.

10. A blind-side repair patch kit for applying, on one side of a panel, a load-bearing structural repair patch over a hole of a certain size through said panel, wherein the hole itself can serve as the sole avenue of access to said one side from the other side of the panel, comprising:
- at least one repair ply of sheet material adapted to be coated with a bonding agent for bonding said ply to said panel, said ply of sheet material having an area substantially greater than said hole area and a shape such as to substantially overlap said hole on all sides thereof, thereby overlying the marginal regions of said hole when placed thereover in alignment with the axis thereof;
- a tension transmission member having a distal end, with a head formed thereon for engagement with a solid washer, and a proximal end for protrusion through said panel hole to said other side of said panel;
- a tension source and locking means for engaging said proximal end and putting said tension transmission member in tension and maintaining said tension;
- a flexible washer having an outside dimension about equal to the outside dimension of said ply of sheet material, said flexible washer having a hole through the center thereof for receipt of said tension transmission member;
- said solid washer having a central hole larger in diameter than said tension transmission member for passage thereof through said central hole, and smaller than said head so that tension in said tension transmission member will cause said head to bear against said solid washer, said solid washer having an outside dimension slightly smaller than said panel hole for insertion through said panel hole before inserting said flexible washer therethrough, and thereafter lying on the side of said flexible washer remote from said panel and bearing thereagainst under the tensile force of said tension transmission member to apply pressure through said flexible washer to said ply of sheet material to ensure good adhesion to said panel.

11. The patch kit defined in claim 10, wherein said flexible washer has radiating flukes extending outward from a central region of said flexible washer, the dimension of said central region being substantially smaller than the outside dimension of said solid washer.

12. The patch kit defined in claim 10, wherein said flexible washer is about twice the diameter of said panel hole.

13. The patch kit defined in claim 10, further comprising at least one additional repair ply adapted to be coated with a bonding agent and applied to said panel other side over said panel hole on the marginal regions around said panel hole, said additional ply having an outside dimension substantially greater than said panel hole whereby to substantially overlap said panel hole and overlie the marginal regions around said panel hole when applied thereover.

14. The patch kit defined in claim 10, further comprising a support plate having an outside dimension about equal to the outside dimension of said other side repair plies, and having a central hole for extension therethrough of said tension transmission member, whereby said tension source and locking means may be engaged with said tension transmission member on the side of said support plate remote from said panel and operated to apply tension to said tension transmission member and reactive force against said support plate to press said support plate toward said panel and squeeze said other side repair ply between said support plate and the marginal regions around said panel hole on said other side of said panel.

15. The patch kit defined in claim 10, wherein said tension transmission member is a non-metallic bolt which is easily cut off flush with said other side repair ply surface after said bonding agent coating said other side repair ply has cured.

16. The patch kit defined in claim 10, further comprising a plug of fill material for fillig said panel hole and holding said repair ply in the plane of said panel one side.

17. The patch kit defined in claim 10, wherein said tension transmission member is a bolt, and further comprising:
- an insertion tool, including a tubular member having an inside diameter about equal to the outside diameter of said bolt and having a flat end for bearing against said one side repair plies to facilitate pushing said one side repair plies through said panel hole from said other side to said one side.

18. The patch kit defined in claim 17, wherein said insertion tool is shorter in length than said bolt so that the proximal end of said bolt may be gripped along with said tool when said flexible washer is pushed through said panel hole to prevent the springing of said flexible washer back to shape after passing through said panel hole from propelling said bolt through said panel hole to said panel one side.

19. The patch kit defined in claim 10, wherein said flexible washer includes at least six flukes radiating outward from a central hub, one side of said flukes being curved to facilitate insertion through said panel hub.

20. The blind-side repair patch kit defined in claim 9, further comprising at least one additional fabric disc adapted to be impregnated with an adhesive and having a diameter sufficiently large to substantially overlap said panel hole and adhere to said panel near side when pressed thereagainst by said back-up plate while said adhesive cures to form a load-bearing structural member capable of carrying substantial stress across said hole to reduce stress concentation around the edges thereof.

21. The blind-side repair patch kit defined in claim 20, further comprising a disc of compliant material having a central hole through which said tension member is slid and which is adapted to be compressed between said near side back-up plate and said panel near side to compress said additional fabric disc against said panel near side and form a smoothly contoured surface thereon while said adhesive cures.

22. The blind-side repair patch kit defined in claim 21, further comprising a sheet of release film for positioning between said disc of compliant material and said additional fabric disc to prevent said compliant material disc from adhering to said additional fabric disc when said adhesive has cured.

23. The blind-side repair patch kit defined in claim 9, further comprising a plug of fill material for filling said panel hole and for supporting said one fabric disc in the plane of said one side of said panel while said bonding agent cures.

24. A blind-side repair patch kit for securely adhering a load-bearing structural repair patch to one side of a panel over a hole in said panel, wherein access to said one side is by way of said hole from the other side of said panel, said kit comprising:
at least one ply of a structural load-bearing filamentous sheet material having an area substantially greater than said hole and a shape such as to substantially overlap said hole on all sides thereof, said sheet material adapted to be adhered with a bonding agent to said one side of said panel over said hole and substantially overlapping all marginal regions therearound to provide a stress transfer structure across said hole to minimize stress concentration in said panel around the edges of said hole;
a first flexible washer having an area substantially greater than the area of said hole, said flexible washer being sufficiently flexible to be flexed and inserted through said hole from said other side, and sufficiently resilient to exert a compressive force toward said sheet material over substantially the entire area of said flexible washer when pressed toward said panel by a rigid washer placed over said flexible washer and urged toward said panel by a tension member extending through said panel hole to said other side at said panel;
said rigid washer having an outside dimension slightly smaller than said hole such that said rigid washer can pass straight through said hole;
said tension member having a length sufficient to extend from said rigid washer, through said flexible washer, filamentous sheet material and said panel when assembled in that order and having a diameter smaller than said central hole;
means for exerting tensile force on said tension member;
means for engaging said tension member on said other side of said panel and preventing movement of said tension member toward said one side from said other side after said tension member is put in tension;
means for coupling said tension member and said rigid washer, such that tension in said tension member is converted to pressure of said rigid washer against said flexible washer, whereby said filamentous sheet material is squeezed against said marginal regions around said panel hole on said one side of said panel to compress said sheet material and express air bubbles therefrom while said bonding agent cures.

25. The blind-side repair patch kit defined in claim 24, further comprising a back-up plate having a hole therethrough for receiving said tension member and against which said tensile force exerting member can bear to react said tensile force in said tension member.

26. The blind-side repair patch kit defined in claim 25, wherein said tension member is a threaded rod, and said tensile force exerting means is a nut which can be threaded onto said rod and torqued up tight against said back-up plate.

27. The blind-side repair patch kit defined in claim 25, further comprising an additional ply of filamentous sheet material adapted to be adhered with a bonding agent to said other side of said panel over said hole and substantially overlapping all marginal regions therearound, and a release film adapted to lie between said additional ply and said back-up plate to prevent adhesion of any structure lying over said additional ply thereto while said bonding agent cures.

28. The blind-side repair patch kit defined in claim 25, further comprising a plug of fill material for filling said hole and supporting said ply of filamentous sheet material in the plane of said one side of said panel while said bonding agent cures.

29. The blind-side repair patch kit defined in claim 24 wherein at least one additional ply of filamentous sheet material is juxtaposed with said one ply to form a stack of plies, and said one ply is oriented with the filaments therein running orthogonally to the filaments in said additional ply, and further comprising one additional flexible washer juxtaposed with said first flexible washer whereby the stiffness of said flexible washers bearing in a stack against said stack of plies is sufficient to provide adequate pressure against said stack of plies while said bonding agent cures to achieve secure bonding and produce a high strength patch.

* * * * *